W. R. BAKER.
HARVESTER.
No. 175,586. Patented April 4, 1876.
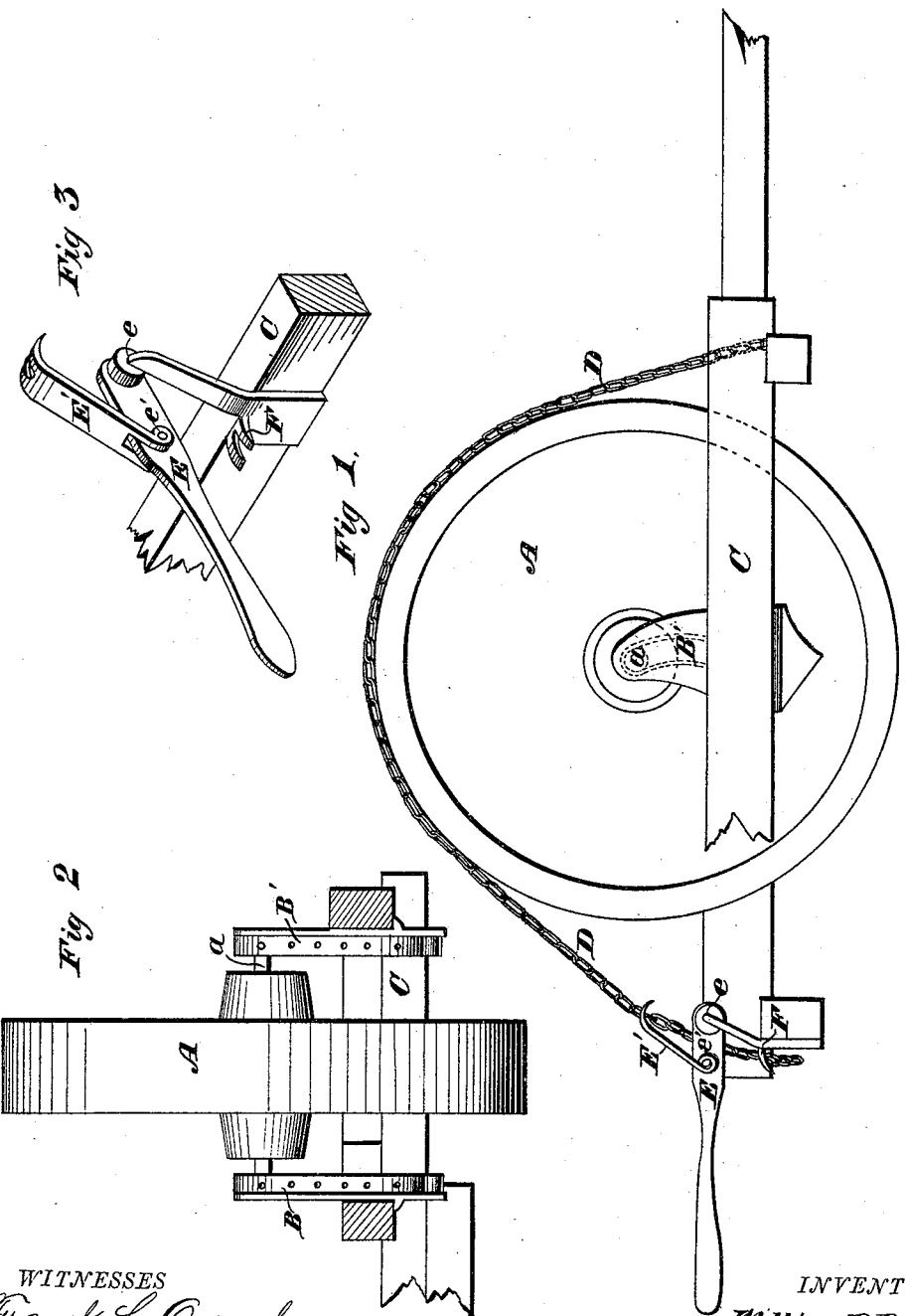
WITNESSES
Franck L. Ourand
Wm A Skinkle
By his Attorney
Wm D. Baldwin
INVENTOR
William R. Baker

UNITED STATES PATENT OFFICE.

WILLIAM R. BAKER, OF CHICAGO, ILLINOIS, ASSIGNOR TO C. H. & L. J. McCORMICK, OF SAME PLACE.

IMPROVEMENT IN HARVESTERS.

Specification forming part of Letters Patent No. 175,586, dated April 4, 1876; application filed February 28, 1876.

*To all whom it may concern:*

Be it known that I, WILLIAM R. BAKER, of Chicago, in the county of Cook and State of Illinois, have invented a new and useful Improvement in Harvesters, of which the following is a specification:

In another application, filed simultaneously herewith, I have shown a method of adjusting the main frame of a harvester upon its driving-axle by means of a chain passing over the driving-wheel and a windlass.

My present invention consists of the combination of a lifting-chain passing over a driving-wheel with a claw-lever, whereby I am enabled to dispense with the windlass.

In the accompanying drawings, Figure 1 represents a side elevation of a harvester to which my improvement is applied; Fig. 2, a front elevation thereof, partly in section; and Fig. 3, a view in perspective of the claw-lever and detent.

The driving-wheel A is mounted on an axle, a, adjustable up and down in curved flanged guides B B', mounted upon a main frame, C. A lifting-chain, D, attached to the front cross-timber of the frame by a hook or staple, passes over the driving-wheel to a claw-lever, E, oscillating on a pivot, e, mounted on the rear cross-timber of the frame, and carrying a hook or claw, E', pivoted thereon at e'. A fixed claw, F, on the frame holds the loose end of the chain, and prevents it from dropping, while the lifting-claw is moving forward to grasp the chain.

In operation, the lever is swung forward and the chain grasped by the claw. The backward movement of the lever then tightens the chain, lifting the main frame bodily parallel with the ground. The claw F, as before remarked, holds the loose end of the chain while the lever is moving forward again to take another hold, this movement being repeated until the frame is lifted to the required height, when the axle is secured in its flanged guides by through-pins, or other well-known equivalent means, and the chain removed.

I prefer the plan shown, as it enables me to do the work with one chain; but it is obvious that by increasing the diameter of the hub of the driving-wheel or mounting sheaves thereon, and duplicating the chain and lifting-levers, the chains could be passed over said sheaves instead of over the driving-wheel; but this is a more complex and costly arrangement; or even one sheave might be employed; but this would not be so good a plan, as the strain would be exerted on one side of the wheel only, and thus tend to throw it out of line.

I do not broadly claim herein lifting the main frame of a harvester by means of chains, nor lifting the main frame by means of a chain and windlass, as that is shown in my other application above mentioned.

I claim as of my own invention—

The combination, substantially as hereinbefore set forth, of the main wheel, the main frame mounted thereon in adjustable bearings, the lifting-chain connected with the main frame and passing over the driving-wheel, and the claw-lever and detent secured upon the frame, for the purpose specified.

In testimony whereof I have hereunto subscribed my name.

WM. R. BAKER.

Witnesses:
JOHN V. A. HASBROOK,
JAMES H. SHIELDS.